United States Patent
Chitroda et al.

(10) Patent No.: US 9,973,543 B2
(45) Date of Patent: May 15, 2018

(54) SEAMLESS SWITCHING BETWEEN COMPUTING DEVICES DURING AN ONLINE MEETING

(71) Applicant: GetGo, Inc., Boston, MA (US)

(72) Inventors: Gaurav Chitroda, Santa Barbara, CA (US); Paul FitzGerald, Palomar Mountain, CA (US); Christopher Duncan, North Hollywood, CA (US); Carey Caulfield, Santa Barbara, CA (US)

(73) Assignee: GetGo, Inc., Boston, MA (US)

( * ) Notice: Subject to any disclaimer, the term of this patent is extended or adjusted under 35 U.S.C. 154(b) by 222 days.

(21) Appl. No.: 14/512,785

(22) Filed: Oct. 13, 2014

(65) Prior Publication Data

US 2016/0105472 A1    Apr. 14, 2016

(51) Int. Cl.
G06F 15/16 (2006.01)
H04L 29/06 (2006.01)

(52) U.S. Cl.
CPC ...... *H04L 65/1063* (2013.01); *H04L 65/1069* (2013.01); *H04L 65/1083* (2013.01); *H04L 65/4038* (2013.01)

(58) Field of Classification Search
CPC ............. H04L 65/1093; H04L 65/1059; H04L 65/1063
See application file for complete search history.

(56) References Cited

U.S. PATENT DOCUMENTS

| | | | | |
|---|---|---|---|---|
| 9,219,762 B2* | 12/2015 | Burch | ................. | H04L 65/1066 |
| 9,277,017 B2* | 3/2016 | Burch | .................. | H04L 67/146 |
| 2008/0244721 A1 | 10/2008 | Barrus et al. | | |
| 2009/0259758 A1* | 10/2009 | Chen | ................... | H04L 65/1066 |
| | | | | 709/228 |
| 2012/0185291 A1* | 7/2012 | Ramaswamy | ..... | G06Q 10/1095 |
| | | | | 705/7.19 |
| 2014/0156854 A1* | 6/2014 | Gaetano, Jr. | ........ | H04L 65/1069 |
| | | | | 709/227 |
| 2014/0171048 A1* | 6/2014 | Sanaullah | ............... | H04W 4/16 |
| | | | | 455/416 |
| 2016/0050160 A1* | 2/2016 | Li | ....................... | H04L 63/0442 |
| | | | | 713/176 |

OTHER PUBLICATIONS

"Handoff Programming Guide." Apple, Inc. Sep. 17, 2014. Retrieved from <https://developerapple.com/library/ios/documentation/UserExperience/Conceptual/Handoff/HandoffProgrammingGuide.pdf> on Sep. 23, 2014.

\* cited by examiner

*Primary Examiner* — Philip Chea
*Assistant Examiner* — Robert B McAdams
(74) *Attorney, Agent, or Firm* — BainwoodHuang

(57) ABSTRACT

Methods and systems for switching between computing devices during an online meeting are described herein. A collaboration server may receive a token from a first computing device connected to an online meeting hosted by the collaboration server. The collaboration server may receive another token from a second computing device and determine whether the received tokens match. If so, the collaboration server may establish an association between the second computing device and the meeting participant attending the online meeting via the first computing device. The collaboration server may accept a request from the second computing device to join the online meeting thus allowing the meeting participant to continue the online meeting from the second computing device.

22 Claims, 5 Drawing Sheets

SEAMLESS SWITCHING BETWEEN COMPUTING DEVICES DURING AN ONLINE MEETING

BACKGROUND

In an online meeting, participants that are located remotely relative to one another may meet in an online environment to collaborate and share resources. Advancements in online meeting technology have allowed meeting participants to join online meetings from various types of computing devices. Often meeting participants may wish to switch to a different device to continue an ongoing online meeting. Meeting participants, however, have faced a variety of challenges in seamlessly switching to a different computing device while an online meeting is in progress. Some of those challenges include manually launching the meeting application at the new computing device, logging into the meeting at the new computing device, configuring the meeting application with the desired meeting settings, and exiting the meeting application from the original computing device. These manual steps require significant amounts of time and disrupt the online meeting in progress. Therefore a need exists for seamlessly switching between computing devices during an ongoing online meeting.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and computer-implemented methods of switching between computing devices during an online meeting. A collaboration server may receive a token from a first computing device connected to an online meeting hosted by the collaboration server. The collaboration server may receive another token from a second computing device and determine whether the received tokens match. If so, the collaboration server may establish an association between the second computing device and the meeting participant attending the online meeting via the first computing device. Establishing the association between the meeting participant and the second computing device may include pairing a user identifier associated with the meeting participant and a device identifier associated with the second computing device. The collaboration server may also accept a request from the second computing device to join the online meeting.

The collaboration server may also transmit a set of meeting settings to the second computing device as well as a notification to the first computing device that the received tokens match. In response to receipt of the notification, the first computing device may transmit a set of application settings to the second computing device in a direct communication. The set of application settings may include at least one video setting and at least one audio setting. In addition, the set of meeting settings and the set of application settings may correspond to the meeting state at the first computing device. The second computing may thus recreate the meeting context based on the set of meeting settings and the set of application settings received. The first computing device may be automatically disconnected from the online meeting once the second computing device has connected to the online meeting. The list of meeting participants maintained by the collaboration server for the online meeting may not change when the second computing device connects to the online meeting.

In accordance with additional aspects described herein a first computing device may connect to an online meeting hosted by a collaboration server. During the online meeting, the first computing device may receive a notification that a second computing device has been selected to join the online meeting. In response to this notification, the first computing device may transmit a token to the second computing device and to the collaboration server. The first computing device may then receive a notification from the collaboration server that the second computing device has been authenticated based on the token. The first computing device may then transmit a set of application settings to the second computing device.

The first computing device may automatically disconnect from the online meeting in response to receipt of a notification that the second computing device has joined the online meeting. The set of application settings may include at least one video setting and at least one audio setting. Furthermore receipt of the set of application settings at the second computing device may cause the second computing device to automatically configure the meeting application used to connect to the online meeting based on the set of application settings received.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards seamlessly switching between computing devices during an online meeting. In this way, the manual steps performed by a meeting participant to switch to a different computing device during an online meeting are advantageously minimized. As a result, the process of switching to a different computing device during an online meeting occurs seamlessly with minimal input from the meeting participant and with minimal disruption to the ongoing online meeting. Additional advantages will be appreciated upon review of the disclosures provided in further detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. Furthermore a "set" of elements as used herein is meant to include one or more elements. Moreover non-transitory computer-readable media refers to all computer-readable media with the sole exception being a transitory propagating signal.

Computing Architecture

Figure 1:
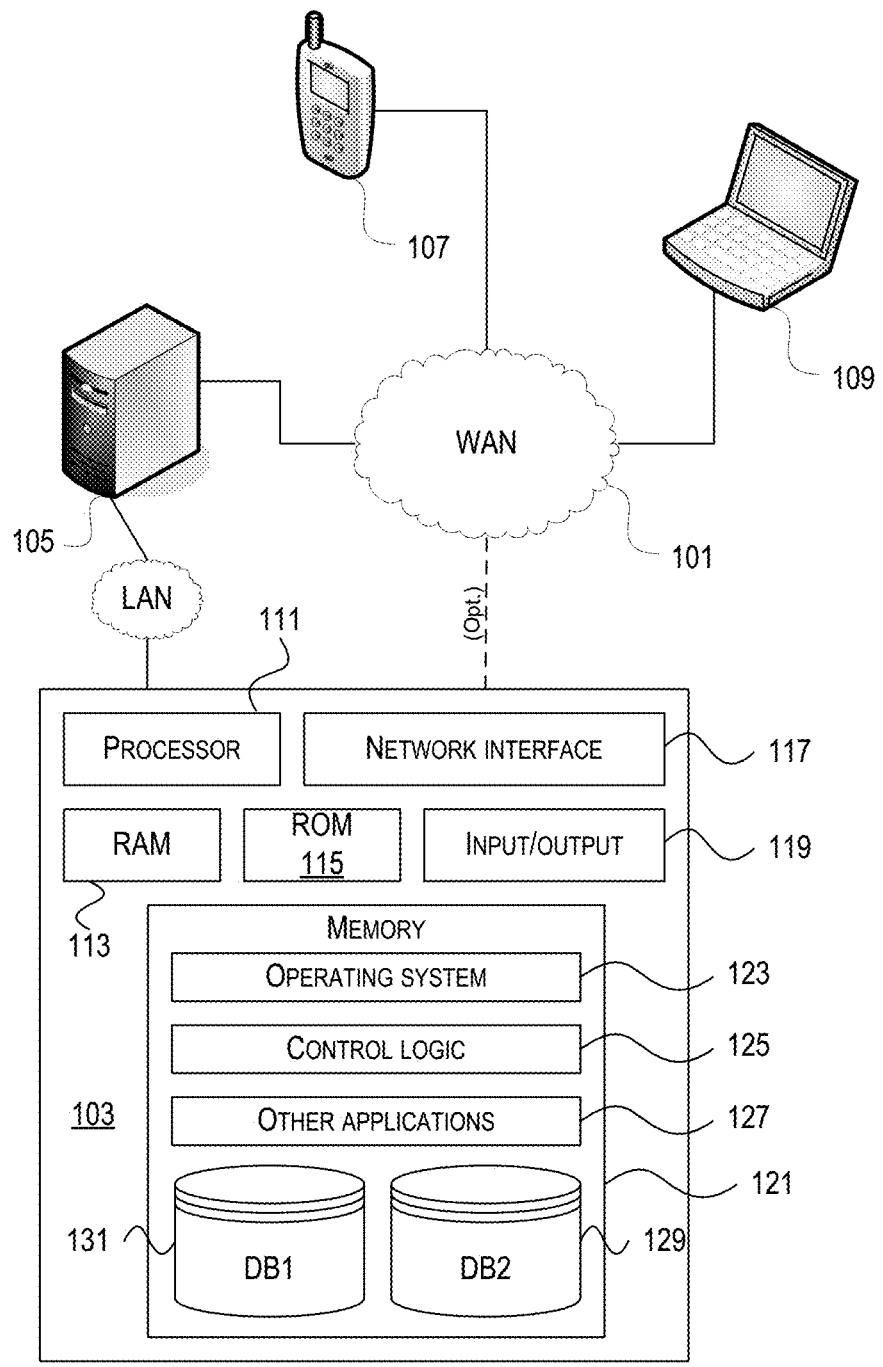
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
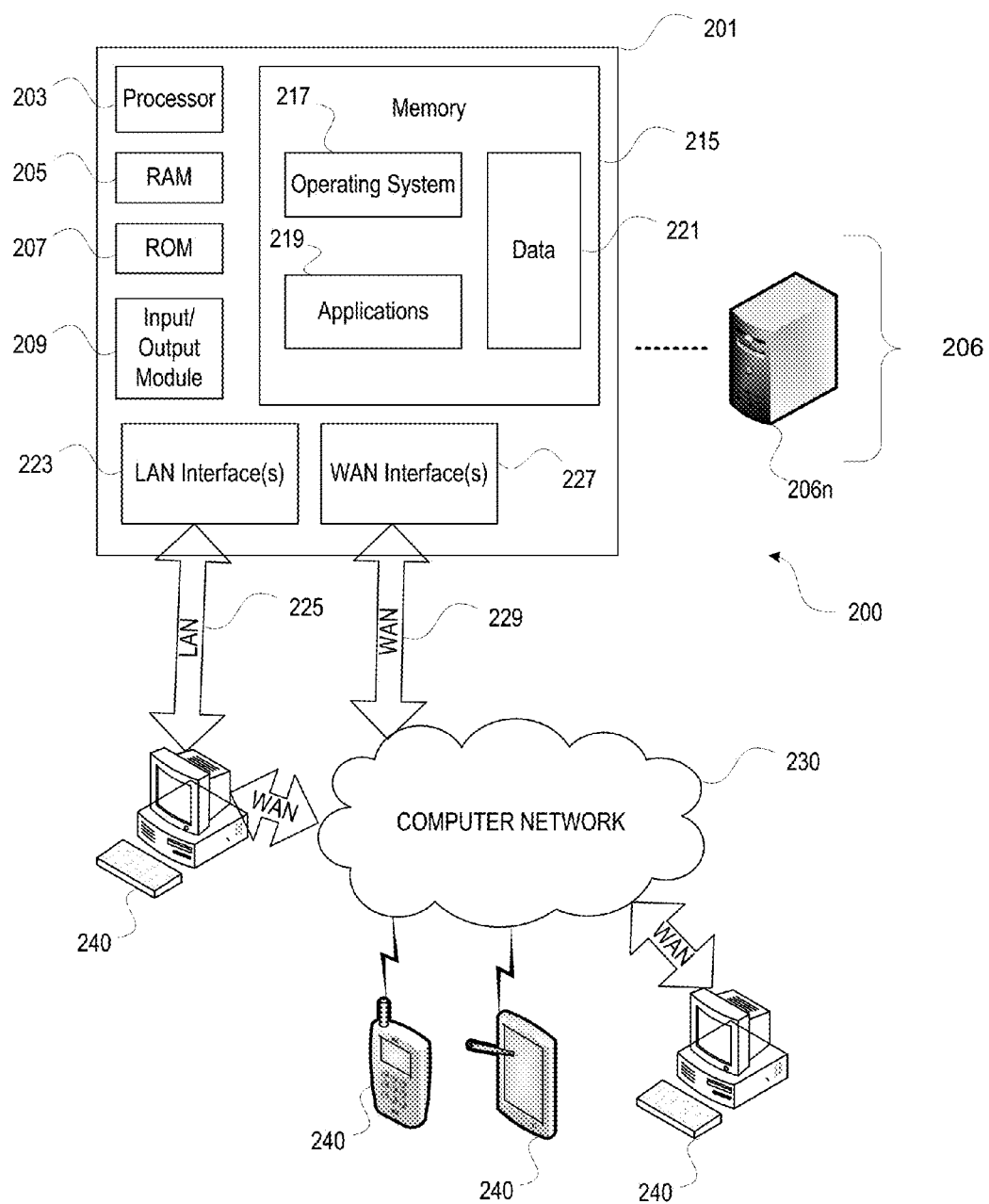
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thing client or remote-display application executing on the client to present display output generated by an application executing on the server 206. The thing client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
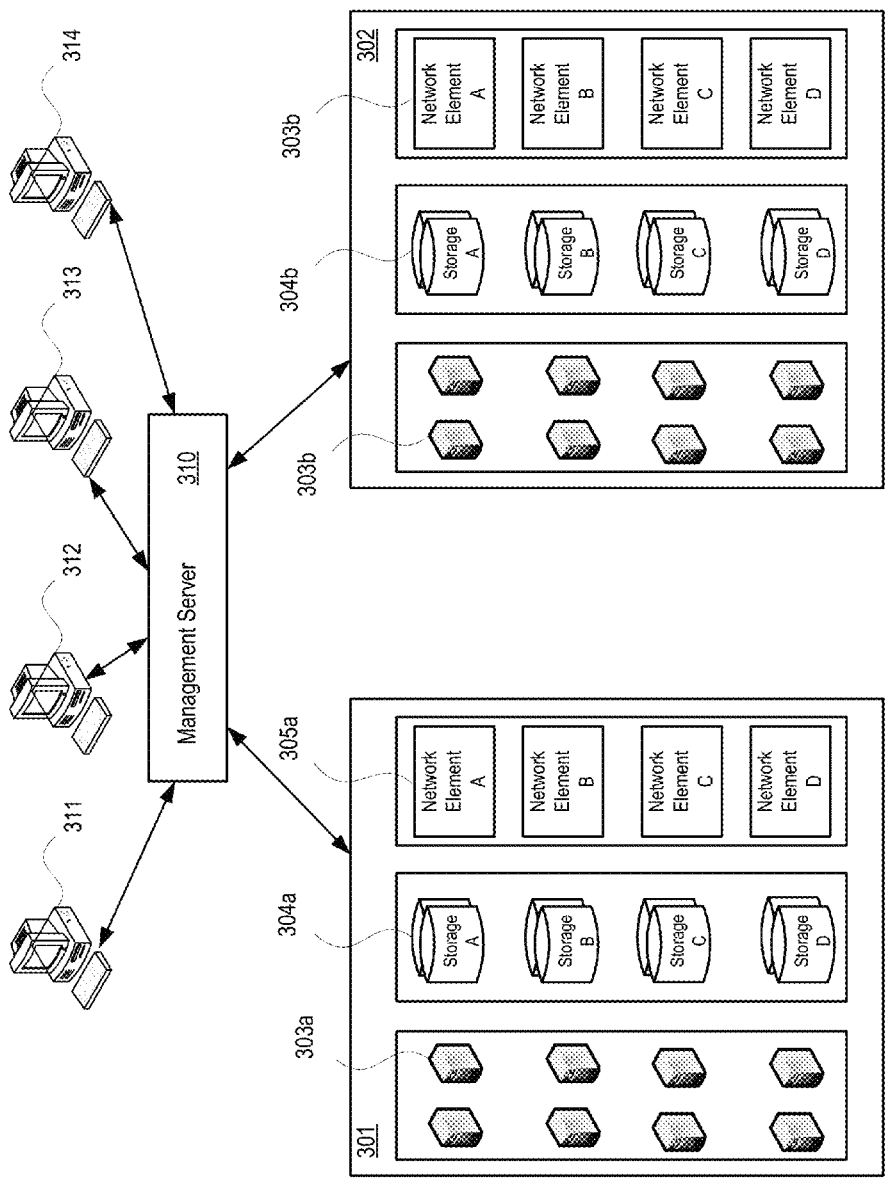
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303, storage resources 304, and network resources 305) of the cloud system.

Management server 310 may be implemented on one or more physical servers. The management server 310 may run, for example, CLOUDSTACK by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system. For example, the management server 310 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management sever 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as the virtualization servers 301 described above, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 303 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 4:
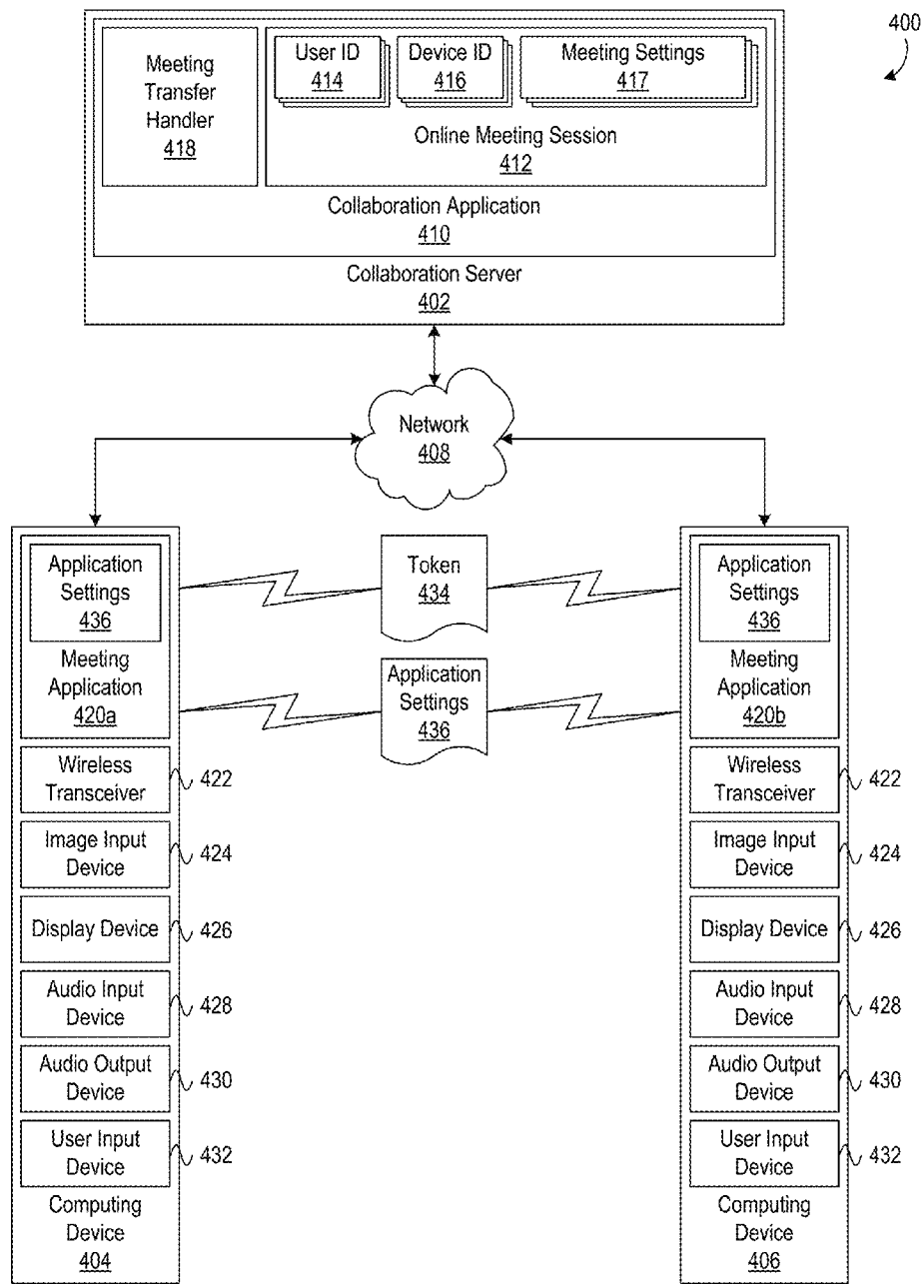
FIG. 4 depicts an illustrative system for seamlessly switching between computing devices during an online meeting in accordance with one or more illustrative aspects described herein.

Illustrative Embodiments of Seamlessly Switching between Computing Devices during an Online Meeting FIG. 4 depicts an illustrative system 400 for seamlessly switching between computing devices during an online meeting in accordance with one or more illustrative aspects described herein. In the system 400 shown by way of example in FIG. 4, a collaboration server 402 is in signal communication with computing devices 404 and 406 via a network 408. The network 408 may include a WAN such as the Internet as well as a cellular network. The computing devices 404 and 406 may also be in direct signal communication with each other as will be described in further detail below.

The collaboration server 402 may include at least some of the same components as the data server 103 described above with reference to FIG. 1. The collaboration server 402, in this example, hosts a collaboration application 410. The collaboration application 410 may facilitate online meetings between users. In particular, the collaboration application 410 may create an online meeting session 412 and maintain the online meeting session for the duration of the online meeting. The online meeting session 412 may identify the users currently joined to the meeting as well as the respective computing devices those users are currently utilizing to participate in the meeting. As seen in FIG. 4, the online meeting session 412, in this example, identifies the users and their respective computing devices via unique identifiers which include a user ID 414 and a device ID 416. The collaboration application 410 may establish an association between the user ID 414 of a meeting participant and the device ID 416 of the device that user utilizes, e.g., by creating an entry in a list of meeting participants that pairs the user ID 414 with the device ID 416. The collaboration application 410 may store the meeting participant list at a memory for the duration of the online meeting. In addition, the meeting participant list may be updated (e.g., by the collaboration application 410 or the meeting transfer handler 418) as meeting participants join the online meeting, leave the online meeting, and switch computing devices during the online meeting.

The online meeting session 412 may maintain a set of meeting settings 417 for the meeting and its participants. The meeting settings 417 may include meeting settings that are global to all meeting participants as well as meeting settings that are particular to individual meeting participants. Global meeting settings may include, for example, a unique meeting identifier, a network address associated with the meeting, a meeting title, a meeting password or access code, supported features (e.g., audio, video, screen-sharing), a text chat stream, shared materials (e.g., shared documents), and the like. Individual meeting settings for a meeting participant may include, for example, user information (e.g., name, display name, email address, phone number, default icon), device information (e.g., platform, operating system, IP address), and meeting application information (e.g., version). Application settings maintained by the meeting applications are described below.

In addition to creating and maintaining the online meeting session, the collaboration application 410 may also be configured to: receive requests to join the online meeting; authenticate users requesting to join the online meeting; maintain a list of current meeting participants; identify the respective locations of the meeting participants; receive audio, video, text, and computer files from the participants and distribute it to the other participants; and other types of activities associated with facilitating an online meeting.

The collaboration application 410, in this example, also includes a meeting transfer handler 418 that facilitates switching between computing devices during an online meeting. The meeting transfer handler 418 may be configured to: receive a notification that a meeting participant wants to switch to a different computing device; authenticate the computing device the meeting participant is switching to; distribute the meeting settings to the computing device the meeting participant is switching to; and update the online meeting session to associate the user ID 414 of the meeting participant with the device ID of the computing device the meeting participant is switching to. As described in further detail below, the computing devices 404 and 406 may utilize a token to facilitate switching between computing device during an online meeting. Accordingly the meeting transfer handler 418 may also be configured to validate the token received from one of the computing devices 404 or 406 when authenticating the computing device. As also described in further detail below, the meeting transfer handler 418, in some example implementations, may be configured to enable a meeting participant to join the meeting from a second computing device and continue the online meeting from both computing devices.

Regarding the computing devices 404 and 406, the following terminology is adopted for convenience. The computing device a meeting participant switches from is referred to in this disclosure as the original computing device. The computing device the meeting participant switches to is referred to in this disclosure as the target computing device. With reference to FIG. 4, the computing device 404 may correspond to the original computing device, and the computing device 406 may correspond to the target computing device.

The computing devices 404 and 406 may likewise include at least some of the same components as the data server 103 described above with reference to FIG. 1. The computing devices 404 and 406 may be, for example, a desktop computing device, a laptop computing device, a tablet computing device, a palmtop computing device, a smartphone, and the like. Accordingly, aspects of the present disclosure may be implemented to advantageously switch, e.g., from a desktop computing device to a smartphone during an online meeting, from a tablet computing device to a laptop computing device during an online meeting, and between other combinations of computing devices that will be appreciated with the benefit of this disclosure.

As seen in FIG. 4 both the original computing device 404 includes a meeting application 420a, and the target computer device includes a meeting application 420b. The meeting applications 420a and 420b may receive at least a portion of the meeting settings 417 from the collaboration server 402. The meeting applications 420a and 420b may thus be configured according to the meeting settings 417 received. As also seen in FIG. 4 both the original computing device 404 and the target computing device 406 each include: a wireless transceiver 422 for exchanging wireless communications with the collaboration server 402 as well as with other computing devices; an image input device 424 such as a camera; a display device 426 such as a monitor or display screen; an audio input device 428 such as a microphone; an audio output device 430 such as a set of speakers; and one or more user input devices 432 which may include a keyboard, trackpad, touchscreen, and the like. The wireless transceiver 422 of the computing devices 404 and 406 may be configured to utilize various wireless technology standards and protocols to exchange wireless communications. In some implementations, for example, the original computing device 404 and the target computing device 406 may utilize Bluetooth to send direct communications to each other. Other wireless technology standards and protocols suitable for exchanging direct communications between computing devices may be selectively employed.

In general, seamlessly switching from the original computing device 404 to the target computing device 406 during an online meeting may include the following: identifying a target computing device within the vicinity of the original computing device; activating the ability to switch to the target computing device; notifying the original computing device that the meeting participant has initiated a switch to the target computing device; authenticating the meeting participant at the target computing device; transferring one or more meeting settings application settings to the target computing device; joining the online meeting from the target computing device; associating the user with the target computing device; and disconnecting from the online meeting at the original computing device.

To identify a target computing device within the vicinity of an original computing device, various device discovery techniques may be selectively employed. In some implementations, for example, the operating system (OS) of a computing device may be configured to wirelessly broadcast its presence and listen for broadcasts from other computing devices announcing their presence. As noted above, Bluetooth communications may be employed in some example implementations for device discovery. Upon discovering another computing device within proximity of the computing device, the computing devices may establish a wireless communication session. In the context of switching between computing devices during an online meeting, the communications exchanged between the original computing device 404 and the target computing device 406 during device discovery may include a communication that indicates the meeting application 420a is executing at the original computing device and capable of being joined from the target computing device 406. In response to receipt of the communication indicating the online meeting may be joined from the target computing device, the target computing device may activate the ability to switch to the target computing device and continue the online meeting from the target computing device. Activating the ability to switch to the target computing device 406 may include displaying a notification at the target computing device with a selectable user input element that initiates the switch to the target computing device when selected by the meeting participant. Where the original computing device 404 and the target computing device 406 operate on the iOS 8 platform or OS X v10.10 platform (or later platform versions), Apple Inc.'s Handoff technology may be leveraged to implement the device discovery and user notification steps. The effective range between the original computing device and the target computing device may depend on various factors such as, for example, the wireless technology standard and protocol employed, wireless transceiver configurations, power level, propagation conditions, and other factors that will be appreciated by those skilled in the art of wireless communications. Generally speaking, however, the original computing device 404 may, in some circumstances, be able to detect the target computing device 406 within a vicinity of up to 100 meters (m). It will be appreciated, however, that additional ranges may be achievable depending on the factors identified above.

If the meeting participant selects to switch to the target computing device 406 in response to the notification presented, the target computing device may launch the meeting application 420b and notify the original computing device 404, e.g., in one of the communications exchanged between the devices. In response to receipt of the notification from the target computing device 406, the original computing device 404 may initiate the process of switching to the target computing device.

In some implementations, the communications exchanged directly between the original computing device 404 and the target computing device 406 might not be encrypted. Accordingly the system 400, in this example, is configured to distribute the meeting settings 417 to the target computing device 406 via the network 408 in order to preserve the security of the online meeting. Communications exchanged between the collaboration server 402 and the computing devices 404 and 406 might be encrypted and thus more secure relative to the direct communications exchanged between the computing devices. In this way the system 400 advantageously avoids exposing potentially sensitive user information when switching to a target computing device during an online meeting. Instead, as shown by way of example in FIG. 4, the original computing device 404 transmits a token 434 to the target computing device 406 in a direct communication.

The token 434 may be a randomly generated token that includes a string of alphabetic, numeric, or alphanumeric characters. In some example implementations, the meeting application 420a of the original computing device 404 may generate the token 434. The original computing device 404, in this example, may then transmit the token 434 to the collaboration server 402 via the network 408 as well as to the target computing device 406 in a direct communication. The meeting transfer handler 418, in this example, may be configured to store the token 434 received from the original computing device and associate the token with the meeting participant (e.g., using the user ID 414, device ID 416, or both). In other example implementations, the original computing device 404 may be configured to notify the collaboration server that 402 that the meeting participant has selected to switch to the target computing device 406. In response to receipt of this notification, the meeting transfer handler 418 may generate the token 434, associate the token with the meeting participant, and deliver the token to the original computing device 404. The original computing device 404 may then transmit the token 434 to the target computing device 406 in a direct communication.

In response to receipt of the token 434, the meeting application 420b at the target computing device 406, in this example, contacts the collaboration server 402 requesting the meeting settings 417 for the meeting participant associated with the token 434. The meeting transfer handler 418, in this example, confirms the token 434 received from the target computing device 406 is valid and is associated with a current meeting participant. If the meeting transfer handler 418 determines the token 434 is invalid or is not associated with a current meeting participant, the meeting transfer handler may reject or otherwise dispose of the request from the target computing device 406. If, however, the meeting transfer handler 418 validates the token 434 received from the target computing device 406, the meeting transfer handler 418 may notify the original computing device 404 that the target computing device 406 has been authenticated.

In response to successful authentication of the target computing device 406, the meeting transfer handler 418, in this example, provides the global and individual meetings settings 417 for the meeting participant associated with the token 434 to the meeting application 420b of the target computing device. In addition, the original computing device 404 transmits a set of application settings 436 to the target computing device 406, e.g., in a direct communication. The application settings 436 may indicate the configuration of the meeting application 420a at the original computing device. Application settings 436 may include, for example, audio settings and video settings indicating how the meeting application 420a transmits and receives audio and video as well as notification settings indicating the manner in which a user is notified when certain events occur during the online meeting. Audio settings may include whether the meeting participant has muted audio input or audio output as well as how meeting audio is transmitted or received (e.g., voice over IP, telephone dial-in). Video settings may include whether the meeting participant is transmitting video, whether video feeds are transmitted or received in high-definition or low-definition, and how received video feeds are presented (e.g., all video feeds shown, user-selected video feed shown, active speaker video feed shown). Notification settings may include the type of notification presented to a user when, e.g., a new participant joins the meeting, an existing participant leaves the meeting, text or other files are received during the meeting, a user is made to be the presented, and the like. Notifications may include, e.g., on-screen notifications, audio notifications, haptic notifications (e.g., vibrations), and the like. Notification settings may also include settings to suppress notifications associated with individual types of events such as those listed above. As noted above, the meeting settings 417 include information indicating how to connect to the meeting as well as user information for the meeting participant. Using the meeting settings 417 received from the collaboration server 402, the meeting application 420b of the target computing device 406 may request to join the online meeting currently in progress. Upon successfully joining the meeting in progress, the meeting application 420b, in this example, automatically configures itself according to the application settings 436 received from the original computing device 404. In this way, the meeting application 420b advantageously recreates the meeting context and state of the original computing device with minimal input from the meeting participant. The meeting application 420b, for example, may utilize the meeting settings 417 and application settings received to automatically populate the text chat stream at the target computing device 406, establish access to the shared resources, select the appropriate audio and video settings, and automatically carry out other configurations with little or no input from the meeting participant.

In some circumstances, there may not be a one-to-one correspondence of computing capabilities between the original computing device 404 and the target computing device 406. As an example, an original computing device may include a camera that transmits a video feed of the meeting participant during the online meeting. The meeting participant in this example, however, may switch to a computing device that lacks a camera. In this circumstance, the meeting application at the target computing device may prompt the meeting participant to select a desired alternative, e.g., utilize a default icon associated with the meeting participant in lieu of a video feed once the target computing device has joined the meeting. As another example, a meeting participant with active screen sharing at a desktop computing device may be prompted to select a screen sharing option when switching to a smartphone where screen sharing might not be desirable. In some example implementations, the meeting application of a target computing device may be configured to carry out a default action when there is not a one-to-one correspondence between device features instead of prompting the meeting participant or if the meeting participant fails to respond to the prompt within a predetermined time period. The default action may be user-configurable at the meeting application.

As noted above, the meeting transfer handler 418, in this example, is configured to update the online meeting session 412 when the meeting application 420b of the target computing device 406 successfully connects to the online meeting. The meeting transfer handler 418 may update the online meeting by associating the meeting participant with the target computing device 406 that recently connected to the online meeting, e.g., using the user ID 414 of the meeting participant and the device ID 416 of the target computing device 406. In this way, the presence of the meeting participant is advantageously maintained even though the meeting participant switches to a different device during the online meeting. Switching to a different computing device using the approach described herein is thus distinguished from manually rejoining the online meeting from another computing device and overcomes the challenges encountered during the manual approach. When the meeting participant leaves the online meeting to manually switch to a new computing device, the presence of the meeting participant is lost while the user launches the meeting application at the new computing device and reconnects to the online meeting. If the meeting participant manually connects to the online meeting from a new computing device before disconnecting at the current computing device, the participant list may duplicate the presence of that meeting participant. The approach described herein, however, advantageously allows a meeting participant to switch to a target computing device during an online meeting without losing or duplicating the presence of that meeting participant. From the perspective of the other meeting participants, the presence of a meeting participant that switches to a new device advantageously does not change.

When the user joins the online meeting from the target computing device 406, the user may intend that the target computing device provide at least one of the video, audio, or text to the online meeting. Prior to switching to the target computing device 406, the original computing device 404 may provide the video stream, audio stream, and text chat stream to the collaboration server 402. The collaboration application 410 may, in turn, distribute the video, audio, and text chat streams to the computing devices of the other meeting participants. Once the target computing device 406 has joined the meeting and once the meeting transfer handler 418 associates the user with the target computing device, the collaboration application may receive at least one of a video stream, an audio stream, and a text chat stream from the target computing device. The collaboration application 410 may thus distribute at least one of the video, audio, or text chat streams received from the target computing device 406 to the other meeting participants. The streams the collaboration server 402 receives from the target computing device 406 may depend on the application settings used to configure the meeting application 420b at the target computing device.

The approach to switching between computing device during an online meeting may also be utilized to join an online meeting from multiple devices while maintaining a single user presence. As an example, a meeting participant may join an online meeting from each of a desktop computing device, a tablet computing device, and a smartphone, and the participant list for the online meeting may only include one entry for that meeting participant as an attendee. Accordingly the meeting transfer handler 418, in this example, may be additionally or alternatively configured to add a new association between the meeting participant and the target computing device 406 rather than change the association from the original computing device 404 to the target computing device. In some example implementations, the meeting participant may indicate whether the original computing device 404 should remain connected to the online meeting after the target computing device 406 joins or whether the original computing device should be automatically disconnected. The option to remain connected at the original computing device 404 may be a user-configurable setting at a meeting application or may be received when the user selects to switch to the target computing device 406.

When a user has joined an online meeting from multiple computing devices, the video, audio, and text chat streams received at the collaboration server may be spread across those computing devices. As an example, the user may join an online meeting from a laptop computing device that includes a camera and provides the video stream and text chat stream associated with the user and from a smartphone that provides the audio stream associated with the user. As another example, a user may join an online meeting from a tablet computing device that provides the video, audio, and text chat streams and from a desktop computing device from which the user can provide meeting resources (e.g., documents and other computer files) as well as a screencast or screenshots. In some example scenarios, the user may select to receive audio, video, or text from the online meeting at multiple computing devices from which the user has joined the online meeting. Additional examples will be appreciated with the benefit of this disclosure. In some example implementations, the meeting applications 420a and 420b may be configured to allow the user to specify which computing device should provide the video stream, audio stream, text chat stream, and the like. Furthermore the multiple computing devices associated with a user and joined to an online meeting may establish a communication channel during the online meeting but external to the scope of the online meeting. For example, the computing devices may both be joined to the online meeting but also be in signal communication through a direct communication link (e.g., Bluetooth) or through a cloud-based communication architecture other than the collaboration server 402.

The meeting transfer handler 418, in this example, is also configured to notify the original computing device 404 when the target computing device 406 successfully connects to the online meeting in progress. The notification may include an instruction indicating whether the meeting application 420a should remain connected to the online meeting or automatically disconnect from the online meeting. Accordingly the meeting application 420a, in this example, is configured to automatically disconnect from the online meeting in response to receipt of such an instruction from the collaboration server 402.

Figure 5:
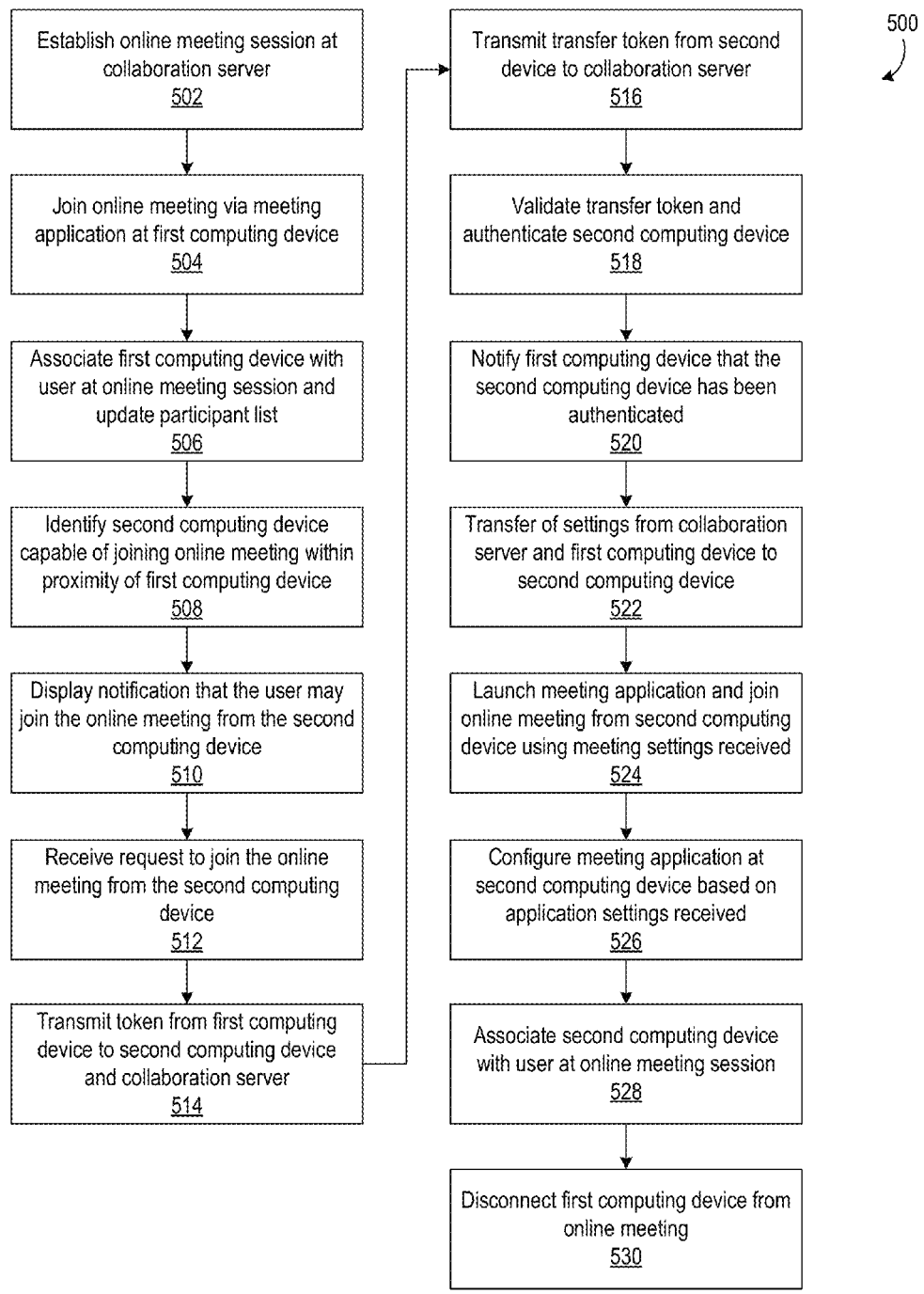
FIG. 5 depicts a flowchart of example method steps for seamlessly switching between computing devices during an online meeting in accordance with one or more illustrative aspects described herein.

Referring now to FIG. 5, a flowchart 500 of example method steps for seamlessly switching between computing devices during an online meeting. The steps shown in FIG. 5 and described below are provided by way of example only. Other approaches to switching between computing devices during an online meeting may include additional or alternative steps that depend on, e.g., the computing devices utilized and the particular implementation employed. Furthermore various steps in FIG. 5 may be performed in an order different from the order illustrated in this example.

As shown in FIG. 5, a collaboration application hosted at a collaboration server may establish a new online meeting (block 502). A user may then join the online meeting via a meeting application residing at a first computing device (block 504). When the user joins the online meeting, the collaboration application may associate the first computing device with the user and update the participant list (block 506) to indicate the user has joined the online meeting. As described above, the collaboration application may associate the first computing device with the user by establishing an association between a user ID of the user and a device ID of the first computing device.

During the online meeting, a second computing device capable of joining the online meeting may be identified within the proximity of the first computing device (block 508). A notification that the user may join the online meeting from the second computing device may be displayed and presented to the user (block 510). As described above, the second computing device may display and present the notification. In some example implementations, however, the first computing device may additionally or alternatively display and present a notification that the user may join the online meeting from the second computing device. A request to join the online meeting from the second computing device may be received (block 512), e.g., at the first computing device or the second computing device.

In response to receipt of the request, the first computing device may transmit a randomly generated token to the collaboration server and to the second computing device (block 514). The collaboration application at the collaboration server may associate the token received from the first computing device with the user utilizing the first computing device to access the online meeting. The second computing device may in turn transmit the transfer token to the collaboration server (block 516) for validation and authentication. If the collaboration application validates the token received from the second computing device—e.g., determines the token matches the token received from the first computing device—then the collaboration application may authenticate the second computing device (block 518).

Upon successful authentication of the second computing device, the collaboration server may notify the first computing that the second computing device has been authenticated (block 520). In addition the collaboration server and the first computing device may transfer various settings to the second computing device (block 522) which may include meeting settings that indicate how to connect to the online meeting as well as application settings that indicate how the meeting application at the second computing device should be configured. The second computing device may launch the meeting application and join the online meeting using the meeting settings received from the collaboration server (block 524). The second computing device may also configure the meeting application using the application settings received from the first computing device (block 526) in order to recreate the meeting state at the second computing device. As noted above, the meeting state created at the second computing device may match the previous meeting state at the first computing device where there is a one-to-one correspondence between the features and capabilities of the first and second computing devices.

When the second computing device joins the online meeting, the collaboration application may associate the user with the second computing device at the online meeting session (block 528). As described above, the collaboration server may receive at least one of a video stream, audio stream, and chat stream from the second computing device and distribute the received stream to the other meeting participants as associated with the user. Once the second computing device has joined the online meeting and is associated with the user, the first computing device may disconnect from the online meeting (block 530). Since the second computing device has already joined the online meeting, however, the presence of the user as a meeting participant does not change thus achieving a seamless switch to the second computing device. As described above, the first computing device may remain connected to the online meeting if the user desires.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computer-implemented method of switching between computing devices during an online meeting comprising:
  receiving, at a collaboration server, a first token from a first computing device connected to an online meeting hosted at the collaboration server, wherein the first token comprises a random string of characters generated by the first computing device;
  receiving, at the collaboration server, a second token from a second computing device, wherein the second token comprises a copy of the first token that was previously transmitted from the first computing device directly to the second computing device;
  determining, at the collaboration server, that the second token matches the first token;
  establishing, at the collaboration server, an association between the second computing device and a meeting participant attending the online meeting via the first computing device responsive to determining the second token matches the first token;
  accepting, at the collaboration server, a request to connect to the online meeting received from the second computing device, wherein accepting the request to connect to the online meeting received from the second computing device is responsive to the association between the second computing device and the meeting participant having been previously established by the collaboration server responsive to the collaboration server determining that the second token matches the first token;

transmitting, from the collaboration server, a set of meeting settings to the second computing device;

transmitting, from the collaboration server, a notification to the first computing device responsive to determining the second token matches the first token;

wherein receipt of the notification at the first computing device causes the first computing device to transmit a set of application settings to the second computing device in a direct communication, wherein the set of application settings includes at least one video setting and at least one audio setting;

wherein the set of meeting settings and the set of application settings correspond to a meeting state at the first computing device;

wherein receipt of the set of meeting settings and the set of application settings at the second computing device causes the second computing device to recreate the meeting state at the second computing device based on the set of meeting settings and the set of application settings;

wherein accepting the request to connect to the online meeting received from the second computing device enables the meeting participant to attend the online meeting via both the first computing device and the second computing device, while continuously maintaining a single user presence in the online meeting for the meeting participant;

wherein the first user device transmits a first data stream from the meeting participant to the collaboration server for the online meeting;

wherein the second user device transmits a second data stream from the meeting participant to the collaboration server for the online meeting; and wherein the first user device and the second user device both receive at least one data stream for the online meeting transmitted from the collaboration server.

2. The computer-implemented method of claim 1 wherein:
a list of meeting participants maintained at the collaboration server for the online meeting does not change when the second computing device connects to the online meeting.

3. The computer-implemented method of claim 1 wherein:
establishing an association between the meeting participant and the second computing device includes pairing a user identifier associated with the meeting participant and a device identifier associated with the second computing device.

4. A system for facilitating online meetings comprising:
a collaboration server hosting an online meeting wherein the collaboration server comprises at least one processor and memory, and is configured to
receive a first token from a first computing device connected to the online meeting, wherein the first token comprises a random string of characters generated by the first computing device,
receive a second token from a second computing device, wherein the second token comprises a copy of the first token that was previously transmitted from the first computing device directly to the second computing device,
determine that the second token matches the first token,
establish an association between the second computing device and a meeting participant attending the online meeting via the first computing device responsive to determining the second token matches the first token,
accept a request to connect to the online meeting received from the second computing device responsive to determining the second token matches the first token, wherein the request to connect to the online meeting received from the second computing device is accepted in response to the association between the second computing device and the meeting participant having been previously established by the collaboration server responsive to the collaboration server determining that the second token matches the first token,
transmit a set of meeting settings to the second computing device,
transmit a notification to the first computing device responsive to determining the second token matches the first token,
receive a first data stream for the online meeting from the meeting participant that is transmitted from first user device,
receive a second data stream for the online meeting from the meeting participant that is transmitted from the second user device, and
transmit at least one data stream for the online meeting to both the first user device and the second user device; and wherein receipt of the notification at the first computing device causes the first computing device to transmit a set of application settings to the second computing device in a direct communication, wherein the set of application settings includes at least one video setting and at least one audio setting;

wherein the set of meeting settings and the set of application settings correspond to a meeting state at the first computing device;

wherein receipt of the set of meeting settings and the set of application settings at the second computing device causes the second computing device to recreate the meeting state at the second computing device based on the set of meeting settings and the set of application settings; and wherein acceptance of the request to connect to the online meeting received from the second computing device enables the meeting participant to attend the online meeting via both the first computing device and the second computing device, while continuously maintaining a single user presence in the online meeting for the meeting participant.

5. The system of claim 4 wherein:
a list of meeting participants maintained at the collaboration server for the online meeting does not change when the second computing device connects to the online meeting.

6. The system of claim 4 wherein:
establishing an association between the meeting participant and the second computing device includes pairing a user identifier associated with the meeting participant and a device identifier associated with the second computing device.

7. A computer-implemented method of switching between computing devices during an online meeting comprising:
connecting to an online meeting hosted by a collaboration server from a first computing device;
receiving, at the first computing device, a notification that a second computing device has been selected to join the online meeting;
in response to receipt of the notification that the second computing device has been selected to join the online meeting i) generating, by the first computing device, a token comprising a random string of characters, and ii) transmitting, from the first computing device, the token to the second computing device and to the collaboration server;
receiving, at the first computing device from the collaboration server, a notification that the second computing device has been authenticated by the collaboration server based on receipt of the token by the collaboration server from both the first computing device and the second computing device;
transmitting, from the first computing device to the second computing device in a direct communication in response to receipt of the notification that the second computing device has been authenticated by the collaboration server, a set of application settings, wherein the set of application settings includes at least one video setting and at least one audio setting;
receiving, at the second computing device from the collaboration server, a set of meeting settings;
wherein the set of meeting settings and the set of application settings correspond to a meeting state at the first computing device;
wherein receipt of the set of meeting settings and the set of application settings at the second computing device causes the second computing device to recreate the meeting state at the second computing device based on the set of meeting settings and the set of application settings;
wherein accepting the request to connect to the online meeting received from the second computing device enables the meeting participant to attend the online meeting via both the first computing device and the second computing device, while continuously maintaining a single user presence in the online meeting for the meeting participant;
wherein the first user device transmits a first data stream from the meeting participant to the collaboration server for the online meeting;
wherein the second user device transmits a second data stream from the meeting participant to the collaboration server for the online meeting; and
wherein the first user device and the second user device both receive at least one data stream for the online meeting transmitted from the collaboration server.

8. The computer-implemented method of claim 7 wherein:
receipt of the set of application settings at the second computing device causes the second computing device to automatically configure, based on the set of application settings, a meeting application used to connect to the online meeting.

9. The computer-implemented method of claim 7, wherein:
the first computing device automatically discovers the second computing device within proximity of the first computing device; and
transmitting the token from the first computing device to the second computing device causes the second computing device to transmit the token to the collaboration server.

10. The computer-implemented method of claim 1 wherein the set of application settings transmitted from the first computing device to the second computing device in the direct communication includes an audio setting that indicates whether the meeting participant has muted audio input on the first computing device during the online meeting.

11. The computer-implemented method of claim 1 wherein the set of application settings transmitted from the first computing device to the second computing device in the direct communication includes an audio setting that indicates whether the meeting participant has muted audio output on the first computing device during the online meeting.

12. The computer-implemented method of claim 1 wherein the set of application settings transmitted from the first computing device to the second computing device in the direct communication includes a video setting that indicates whether the meeting participant is transmitting video on the first computing device during the online meeting.

13. The computer-implemented method of claim 1 wherein:
receipt of the set of application settings at the second computing device causes the second computing device to automatically configure, based on the set of application settings, a meeting application used to connect to the online meeting.

14. The computer-implemented method of claim 1, wherein:
the first computing device automatically discovers the second computing device within proximity of the first computing device; and
transmitting the token from the first computing device to the second computing device causes the second computing device to transmit the token to the collaboration server.

15. The system of claim 4 wherein the set of application settings transmitted from the first computing device to the second computing device in the direct communication includes an audio setting that indicates whether the meeting participant has muted audio input on the first computing device during the online meeting.

16. The system of claim 4 wherein the set of application settings transmitted from the first computing device to the second computing device in the direct communication includes an audio setting that indicates whether the meeting participant has muted audio output on the first computing device during the online meeting.

17. The system of claim 4 wherein the set of application settings transmitted from the first computing device to the second computing device in the direct communication includes a video setting that indicates whether the meeting participant is transmitting video on the first computing device during the online meeting.

18. The system of claim 4 wherein:
receipt of the set of application settings at the second computing device causes the second computing device to automatically configure, based on the set of application settings, a meeting application used to connect to the online meeting.

19. The system of claim 4, wherein:
the first computing device automatically discovers the second computing device within proximity of the first computing device; and transmitting the token from the first computing device to the second computing device causes the second computing device to transmit the token to the collaboration server.

20. The computer-implemented method of claim 7 wherein the set of application settings transmitted from the first computing device to the second computing device in the direct communication includes an audio setting that indicates whether the meeting participant has muted audio input on the first computing device during the online meeting.

21. The computer-implemented method of claim 7 wherein the set of application settings transmitted from the first computing device to the second computing device in the direct communication includes an audio setting that indicates whether the meeting participant has muted audio output on the first computing device during the online meeting.

22. The computer-implemented method of claim 7 wherein the set of application settings transmitted from the first computing device to the second computing device in the direct communication includes a video setting that indicates whether the meeting participant is transmitting video on the first computing device during the online meeting.

* * * * *